United States Patent [19]

Horváth et al.

[11] 4,116,328

[45] Sep. 26, 1978

[54] APPARATUS FOR REPLENISHING CONTAINERS FOR THIN AND FLEXIBLE COMPONENTS

[75] Inventors: László Horváth; Ferenc Major; Ottó Gaál; Sandor Lengyel, all of Budapest, Hungary

[73] Assignee: Egyesult Izzolampa es Villamossagi Rt., Budapest, Hungary

[21] Appl. No.: 682,107

[22] Filed: Apr. 30, 1976

[30] Foreign Application Priority Data

May 5, 1975 [HU] Hungary ............................ EE 2327

[51] Int. Cl.[2] ............................................ B65G 47/06

[52] U.S. Cl. .................................... 198/648; 198/859; 214/302; 198/800

[58] Field of Search .................... 198/37, 40, 137, 140, 198/148, 154, 158, 339, 341, 347, 472, 648, 800, 859; 211/78, 121, 122; 312/35, 42, 73, 97, 97.1; 214/16.4 R, 301, 302

[56] References Cited

U.S. PATENT DOCUMENTS

| | | | |
|---|---|---|---|
| 1,348,490 | 8/1920 | Gill | 198/158 |
| 2,359,070 | 9/1944 | Aasted | 198/154 X |
| 2,704,614 | 3/1955 | St. John et al. | 198/800 |
| 2,729,531 | 1/1956 | Andersen | 198/138 X |
| 2,816,000 | 12/1957 | Scholfield et al. | 198/137 X |
| 2,877,885 | 3/1959 | Wheeler, Jr. | 198/37 |
| 2,885,058 | 5/1959 | Barker et al. | 198/158 X |
| 2,987,251 | 6/1961 | Alexander, Jr. et al. | 198/40 X |
| 3,137,533 | 6/1964 | Acker | 312/35 |
| 3,199,658 | 8/1965 | Graber et al. | 198/137 |
| 3,655,080 | 4/1972 | Gianese | 214/302 |
| 3,672,522 | 6/1972 | Wahle et al. | 214/302 |
| 3,684,339 | 8/1972 | Perkins et al. | 312/73 |
| 3,710,477 | 1/1973 | Frawley | 198/341 |
| 3,776,419 | 12/1973 | Zinkgraf et al. | 312/35 X |
| 3,791,504 | 2/1974 | Wiser et al. | 198/472 |
| 3,967,740 | 6/1976 | Molins | 214/301 |

*Primary Examiner*—Bruce H. Stoner, Jr.
*Assistant Examiner*—Richard K. Thomson

[57] ABSTRACT

To replenish containers that are relatively inacessible and/or perform advancing or oscillating movements with thin, cut-to-size wire pieces, such as lead-in wires to be filled into hoppers of stem making machines for electric light sources related to the rate of depletion of the wires, the wires are charged in this replenishing apparatus into storage containers e.g. hoppers, which are temporarily stationary and remote from their actual working positions, and the depleted storage containers are replaced at predetermined intervals with the thus charged full containers.

4 Claims, 3 Drawing Figures

APPARATUS FOR REPLENISHING CONTAINERS FOR THIN AND FLEXIBLE COMPONENTS

This invention concerns an apparatus for replenishing storage containers with thin, cut-to-size wire pieces.

More particularly, the invention relates to replenishing lead-in wire hoppers of stem making machines that make stems in the manufacture of light sources. Such machines, or at least relevant parts thereof, are continuously advanced or oscillated, and/or are generally not readily accessible for manual topping-up of their storage hoppers. These hoppers are to be manually topped up with components (which are expediently placed in previously prepared unit packs) at a rate functionally related to the rate of consumption (decrease in the quantity left) of the stored components.

The invention thus relates to an apparatus that comprises at least one lead-in wire storage hopper positionally coordinated with a rotary lead-in wire loading device that performs, in use, a controlled oscillating movement, and a control mechanism for intermittently moving (indexing) the storage container(s) or the hopper(s) along a predetermined path or track of movement in accordance with a predetermined time program.

One of the fundamental determining conditions for the construction of highly automated, high-volume production lines and machine groups for the mass production of electric light sources, and of the operation thereof with a minimum number of operating personnel, is the highest possible degree of mechanization and automation of the feeding (loading) of components. From this point of view the feeding of thin pieces of wire, especially the mechanized loading of lead-in wires, represents a special problem due to the fact that the wires have a small diameter and a length greater than their diameter by several orders of magnitude. As a consequence, such wires are very flexible. A further characteristic is that they are made from a plurality of parts of different materials and different cross-sections joined together by welding which often gives rise to welding joint knobs or seams of varying masses and dimensions.

Because of the small diameter and the flexibility it is generally difficult to pick up individual lead-in wires from a mass of generally bundled and stored lead-in wires. Nevertheless, there exist conventional, intermittently operating (indexing) lead-in wire loading units with an output of at most 2,000 pieces per hour, but such production units have not had a satisfactory reliability record.

The essence of the known loading units is that the lead-in wires are fed manually into pouch-like containers which are moved at a rate corresponding to the rate of indexing of the stem making machine of the light source production line, and by this advancing movement they pass into the area of action of appropriately constructed lead-in wire pick-ups; then they pass out in orderly fashion from that area, while the stored lead-in wires are shaken up to provide a cyclic loosening of the bundle of wires.

In addition to this movement of the hoppers, it is another characteristic of the known lead-in wire feeding units that the holding capacity of the hoppers is limited, on the basis of practical experience, to about 600 pieces and that, in the interest of reliable picking-up and unloading, the desirable and permissible lower limit of the number of lead-in wires stored in containers is about 100 pieces, for any feed rate.

In the course of attempts to increase the production rate of light-source assembly lines, the development of continuous-motion production machinery has caused a quantum-like jump in output. However, this has been accompanied by a number of previously unknown problems. In particular, the adaptability of the above-described known lead-in wire loading units has been rendered doubtful by the need for a virtually constant replenishment of the lead-in wires, stemming from the very fast rate of consumption of the stored components. This in itself would not only require the employment of operating personnel employed specifically and solely for this task, but the accelerated rate of movement also has the consequence of rendering the manual refilling of the hoppers very difficult, creating working conditions with a high risk of accidents. Finally, for design and positioning reasons, the actual working position of the lead-in wire hoppers has become virtually inaccessible.

A system for feeding lead-in wires, different from the above and practicable in principle, has become known from British Pat. No. 835,921 and its Patent of Addition No. 869,811. The essence of the system described in these patents is that the lead-in wires disposed in bundles are arranged in slot(s) formed on the outer surface of a rotary drum. As the drum rotates, the wires fall from the bundle one-by-one into the slot(s) by gravitation or by vacuum suction and are then transferred to an appropriately constructed gripper mechanism on the stem making machine heads.

However, it is a disadvantage of this known construction that reliable operation can in practice be ensured only by additional and costly measures and by the use of highly uniform and high-quality lead-in wires, which criteria cause a significant increase in costs and create requirements that have no role or significance from the point of view of the quality of the final product.

Accordingly, the aim of the invention is the provision of a novel technological solution to the problem of lead-in wire feeding wherein the above-listed defects and disadvantages are eliminated or reduced, and which provides a lead-in wire loading system capable of being used in the high-output production lines described above, which enables the replenishment of depleted stores or hoppers without any increase in the number of operators required.

The aim of the invention is attained by apparatus wherein the thin components, particularly lead-in wires, are filled into storage containers or hoppers that are temporarily stationary at positions remote from their working positions, and the at least partially depleted containers or hoppers are replaced at predetermined intervals by containers or hoppers that have been previously replenished externally of their working positions.

According to important features of the invention, the exchange of restocked and depleted hoppers is performed automatically, either by a continuous or, more conveniently, a periodical sensing of the quantity of components stored in the hoppers disposed in their actual working positions, or by the detection and registration of the accumulated total number of the unloaded components when the permissible lower limit is reached in the hoppers.

The essence of the apparatus embodied in the invention resides in that there are storage hoppers for the lead-in wires, arranged at a uniform spacing on a guided endless conveying device, e.g. a conveyor chain, which is intermittently advanced along a path which includes the working positions, and the conveying device is provided with an advancing or indexing mechanism controlled by a program control device.

In a preferred, exemplary embodiment of the apparatus of the invention, the hoppers are releasably secured on holders rotatably journalled on the conveying device and fixed in a positionally accurate orientation in a quick-release or exchangable manner, while the correct positioning along the path or track of the hopper holders is ensured by guide rails. The latter include, in the region of the working positions, an alternatingly moving rail or track section.

The conveying device is preferably provided with a ratchet type indexing mechanism including a position-maintaining locking device, a braking device and controlled by pneumatic rams or piston-and cylinder units (hereafter referred to simply as "cylinders"). The pneumatic working cylinders for actuating the locking and braking devices may form part of an electro-pneumatic follower and controller system that in turn, in part of a program controlling unit containing manual command and inhibiting controls.

The indexing mechanism may preferably also be operated by a rack-and-pinion mechanism or by a cable or chain drum mechanism in place of the ratchet mechanism.

A preferred, exemplary embodiment of the apparatus according to the invention will now be described, with reference to the accompanying somewhat schematic drawings, wherein.

Figure 1:
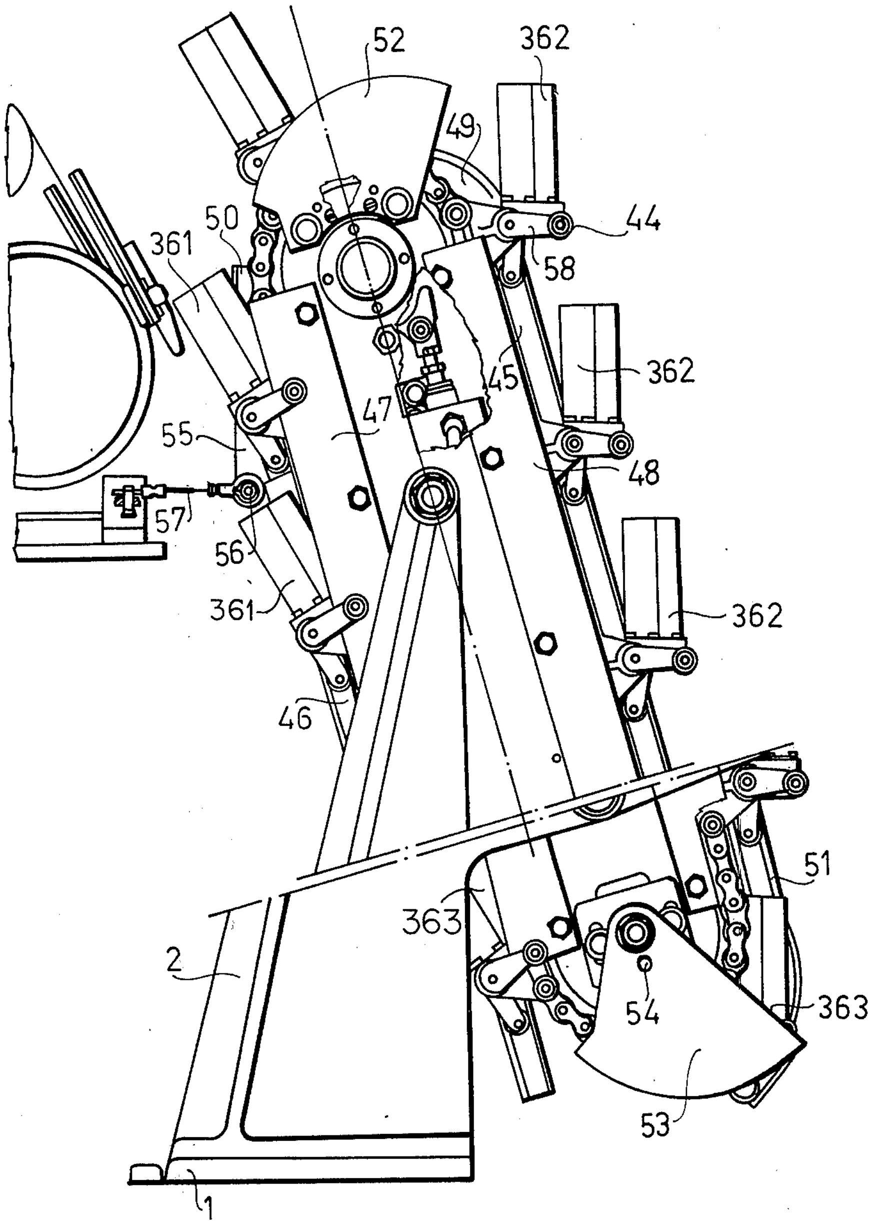
FIG. 1 is a schematic side view of an exemplary, preferred apparatus embodied in the invention.

A preferred embodiment of the apparatus according to the invention illustrated in the drawings has a rigid frame comprising a base 1 (FIG. 1) and pedestals 2 carrying, by way of bolts 3 (FIG. 2) and spacers 4, side plates or frame members 5, 6. An upper drive shaft 7 (FIG. 3) is journalled in ball bearings 10 disposed in a deep-grooved bearing housing 8 sealed by cover plates 9 and screwed to the side plates 5, 6. Chain sprockets 11 and a ratchet wheel 12 are fixed to the drive shaft 7, and the ratchet is also provided with a cam track or rail 59 (FIG. 3) which provides braking and positionally accurate locking.

Figure 2:
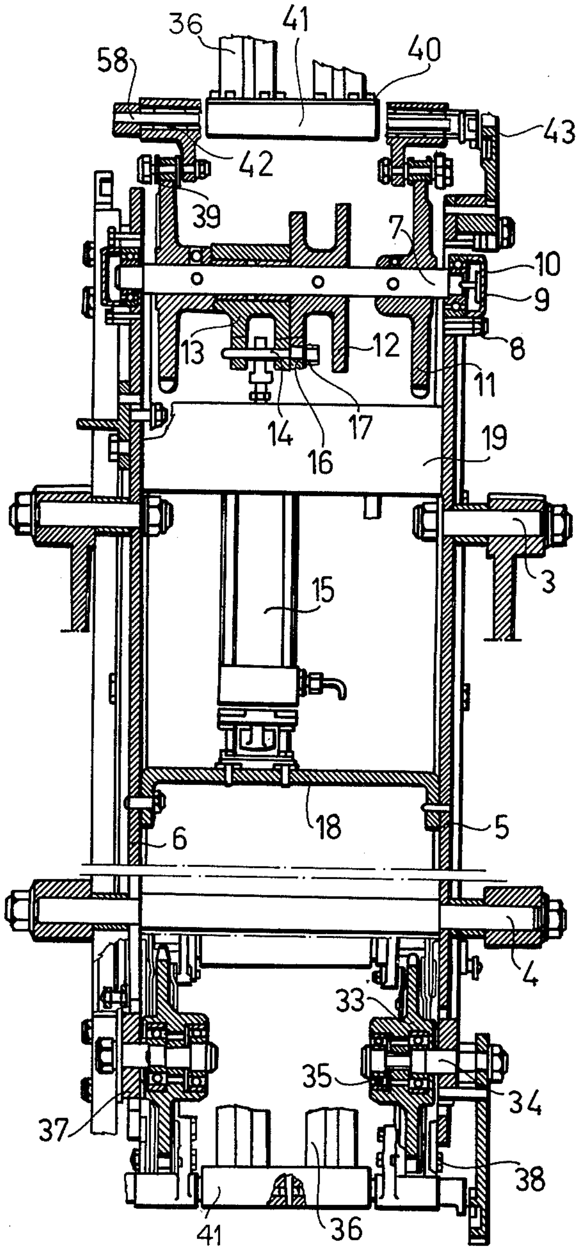
FIG. 2 is a vertical section of the apparatus according to FIG. 1.

On the left-hand side as viewed in FIG. 2, between the sprocket wheel 11 and the ratchet wheel 12 there is an arm 13 which is journalled for free wheeling and has a bolt 14 coupled to a pneumatic working cylinder 15 for actuating the whole system. On the same bolt 14 a pawl 16 is journalled and is clamped to the ratchet wheel 12 by a torsion spring 17. At the bottom, as viewed in FIG. 2, the actuating cylinder 15 is mounted on a yoke 18 serving to connect and stiffen the side plates 5 and 6.

A further yoke 19 (see also FIG. 3) of similar function fixedly carries a holding element 20 on which a pneumatic working cylinder 21 of a short stroke is journalled, the piston rod of which is formed at 24 and is connected to a locking element 22 by way of an actuating arm 23. Under the lower end of a locking element 22, a limit switch 25 is arranged which is fixed to a wall element 26. In order to increase the speed with which the locking device 22 operates, the latter is supported on a compression spring 27.

The locking element 22 and a brake shoe 28 associated with the cam track 59 (FIG. 3) are guided in a housing 29 secured to the yoke 19 together with the wall element 26. The upper dead centre position of the brake shoe 28 is defined or limited by a screw bolt 30 and a compression spring 31 keeps its position constant. The tension of the compression spring 31 can be adjusted by means of a grub screw 32. In the locked position the brake shoe 28 does not engage the cam track 59, and braking takes place at a position which is before the attainment of the fully locked position.

Lower sprocket wheels 33 (see again FIG. 2) of the apparatus are mounted by way of ball bearings 35 on separate shafts 34. This mode of construction is necessary in order to enable the lead-in wire storage containers or hoppers (see numeral 36 generally applied at the bottom of FIG. 2), specifically designated by numeral 363 (see FIG. 1) positively guided with their opening facing upwardly, to be able to turn over to the other, replenishment side, i.e. as shown in the drawing, in the region of the hoppers designated by 362. The shafts 34 are journalled in adjustable holder plates 37 so as to allow chains 38 to be adjusted in tension.

Equi-spaced bearings are provided between the links of the chains 38 by way of bolts 39, mutually opposite bearings 40 being connected by respective shafts 58. Hopper holders 41 are secured to the shafts 58 and carry the hoppers 362, 363 as well as a hopper 361 (all in FIG. 1) in a readily exchangeable manner, e.g. by quick-release fastenings, and positionally accurately oriented.

At both ends of the shafts 58 arms 42, 43 are secured and are provided with respective rolling elements 44 (FIG. 1). The latter are arranged to roll along linear track sections defined by rail-like elements 45, 48, 49, 50 and 51 and arcuate track sections or bends 52, 53, to ensure that the hoppers (36) 361, 362 and 363 have the desired orientation at all times.

Along the track sections corresponding to the axial distance of the sprockets 11 and 33 the chains 38 are guided by chain guide rails 46, 47 along which ball-bearings roll that are journalled at the ends of bolts 39. The lower arcuate section 53 is secured to the shaft 34 of sprocket 33, and its accurate positioning is assisted by dowels 54.

An element of the apparatus that is important from the point of view of correct functioning fits into the guide path, namely a track 55 which is controlled by a cam (connected to an adjacent, e.g. stem making, machine and only schematically illustrated in FIG. 1 of the drawing) by way of a connecting rod 57 provided with a ball joint 56. The track 55 carries out an alternating oscillating movement which ensures that the hoppers 361 when disposed in the working position cyclically move out of the path of advance of the lead-in wire pick-up jaws, and also ensures that the lead-in wires continually loaded into and unloaded from the hoppers are loosened and shaken into place.

The preferred embodiment shown in the drawing has altogether 12 pairs of hoppers 361, 362 and 363 of which at least six pairs of hoppers 362 are disposed in a position which is readily accessible, stationary, and permits manual filling or refilling within a short time and without risk of accidents (note FIG. 1 being cut so as to shorten the illustration, thus omitting some parts and hoppers). Assuming that in a given individual hopper 362 about 600 lead-in wires can be stored and that the minimum permitted stored quantity is 100 pieces, it will be readily seen that for a nominal apparatus output of 3600 wires per hour, the hoppers need to be refilled only at a rate of (600 − 100) × 6 = 3,000 seconds, i.e. about once every 50 minutes. The operating personnel whose task the refilling is can perform other tasks in the remaining time.

It takes about eight minutes for a fully charged hopper 361 to be depleted to its minimum level of 100 pieces, and the readily accessible six pairs of hoppers 362 can be replenished in a time shorter than this. With the data assumed, therefore, the replacement of the hoppers, i.e. the indexing by one step of the conveying device consisting of chains 38, takes place at intervals of about eight minutes.

The apparatus is controlled and actuated, by way of example, by a controlling counter (not shown) of an adjacent production unit (stem making machine) which counts the number of a given component fed to that machine. When approximately 470 to 480 components have been counted the counter gives a signal and the program control device of the apparatus embodied in the invention provides a warning signal to the refilling personnel e.g. by lighting up a red lamp disposed at a well observable position and/or by an audible signal.

After about 20 to 30 component feed cycles following the lighting up of the warning lamp and/or the emission of an audible signal the program control device actuates the working cylinder 21 for releasing the positional locking by way of an electro-pneumatic valve. The working cylinder 21 in its lower position actuates the limit switch 26 and actuates the working cylinder 15 by way of a further electro-pneumatic valve to index the chain 38 by one step whereby to carry out the replacement of the depleted hoppers 361 disposed in the working position by the previously filled or replenished hoppers 362.

The indexing advance must be timed within strictly observed limits, and the time available drops proportionally with the increase in output. It is a necessary condition that the start of the indexing advance should take place immediately after the pick-up and lifting of the first lead-in wire and should be terminated by the time the unloading of the next one is due, according to the fixed working program. To this end the above-mentioned servo-type electro-pneumatic valves are integrated into the control gear of the adjacent stem making machine, and the counter is used merely to adjust the state of readiness of the operation while, in the sense of the above, the programmed indexing movement is initiated from the control gear.

Manual replenishment may take place into the stationary hoppers 362, i.e. during the indexing dwell period of the apparatus. Alternatively, it may take place at a separate working position since the hoppers may easily be removed i.e. are readily replaceably constructed and are accurately positioned.

In the following, the operation of the inventive replenishing apparatus will be recapitulated with reference to the major elements of the apparatus. The (preferably electro-pneumatic) control mechanism of the invention, that can be chosen freely to cooperate with the apparatus, becomes operative after a predetermined number of lead-in wires or electrodes has been dispensed, the number ranging preferably between 470 and 480 (max. about 600), depending on the capacity of the individual storage containers or hoppers, although the control function can also be initiated when the quantity of wires in the containers has been depeleted to about 100 or so.

Whatever the threshold value set for the amount of wires, an appropriate signal initiates a first step, possibly operating a magnetic valve, which actuates the short-stroke pneumatic working cylinder 21 that moves in the "minus" or reverse direction against the spring 27, withdraws the locking element 22 from a recess provided on the periphery of the cam track or rail 59 (rigid with the upper drive shaft 7). This releases the arresting of shaft 7 and allows subsequent movement thereof. When the cylinder 21 reaches the end of its stroke, the limit switch 25 (on the element 26) is operated, which activates the pneumatic working cylinder 15 (possibly by the intermediary of another magnetic valve).

During each stroke of the cylinder 15, the chains make one step together with the carried containers or hoppers, by the intermediate action of the shaft 7 and the chain sprockets 11 fixed thereto. This of course brings previously filled containers to take the places of the depleted ones.

The movement is transferred by the cylinder 15 to the shaft 7 by means of a conventional ratchet-type indexing mechanism; it has been seen from the detailed description that this mechanism includes the arm 13 which is freely journaled on the shaft 7, and carries the pawl 16, and the ratchet wheel 12 that rotates with the shaft 7. In the course of the stepping action, the cam track 59 turns simultaneously with the shaft 7 and the ratchet wheel 12.

Figure 3:
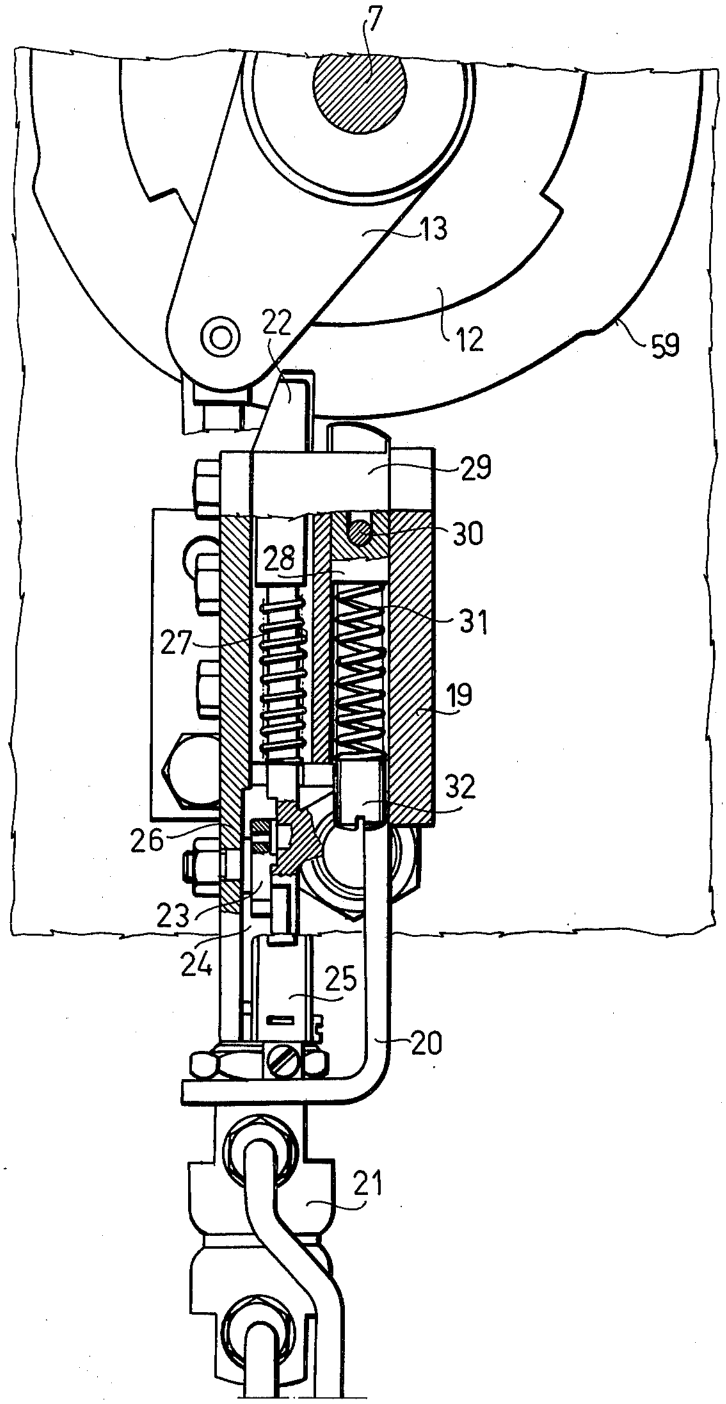
FIG. 3 is a side view on an enlarged scale of an indexing mechanism of the apparatus.

It can be seen from FIG. 3 that the mantle of the cam track or rail 59 has protruding sections with a radius on account of which latter they make frictional engagement with the brake shoe 28, guided in the housing 29 and supported by the spring 31. Before completion of each step, an adjustable degree of braking action is thus obtained. However, before reaching the arrested end position, the protruding sections of the cam track 59 end so that a gap remains between the latter and the brake 28. This arrangement ensures easy and prompt startability for the next stepping action.

When stepping is completed, the working cylinder 21 is changed over, resulting in that the locking element 22 enters one of the recesses of the cam track 59, aided by the spring 27, thus immobilizing the operative elements of the ratchet mechanism. After the containers or hoppers are emptied or reduced to the predetermined minimum content, the above-described procedure is periodically repeated.

What is claimed is:

1. An improved apparatus for replenishing depleted, relatively inaccessible and moving containers that contain thin, cut-to-size components at a rate independent of a high-velocity product output that involves the components, the apparatus comprising, in combination: a component loader of a rotary construction; a plurality of component storage containers arranged on an endless conveying device and guided for oscillating movement; a control mechanism for alternatingly moving said containers according to a predetermined timing and along a predetermined path; means for guiding said conveying device along a path which includes working positions of said containers; indexing means for intermittently advancing said conveying device; a device for controlling the operation of said indexing means; a plurality of holders for said containers, rotatably journalled on said conveying device; arms on said holders, guided along the path of said conveying device, defined by fixedly arranged straight track sections, arcuate track sections, and a track section arranged for moving alternatingly in the regions of the working positions of said containers; and means for releasably securing said containers to said holders for accurate positioning, allowing replacement of empty containers when a previous supply of filled containers is depleted.

2. The apparatus as defined in claim 1, wherein said conveying device includes at least two endless chains running along parallel tracks and connected by means of shafts of said holders.

3. The apparatus as defined in claim 1, wherein said indexing means is operated by a ratchet-and-pawl mechanism.

4. The apparatus as defined in claim 3, wherein said ratchet-and-pawl mechanism includes a ratchet, an arm on said ratchet, a first pneumatic working cylinder for controllin said ratchet, a braking track, and a separate position locking element for said ratchet, a separate second pneumatic cyclinder for actuating said locking element, and a resiliently biased brake shoe for said ratchet.

* * * * *